Oct. 2, 1923.

R. GOOD

MANUFACTURE OF GLASSWARE

Filed May 2, 1921 3 Sheets-Sheet 1

1,469,457

Inventor
Robert Good
By his Attorney
Clarence Kerr

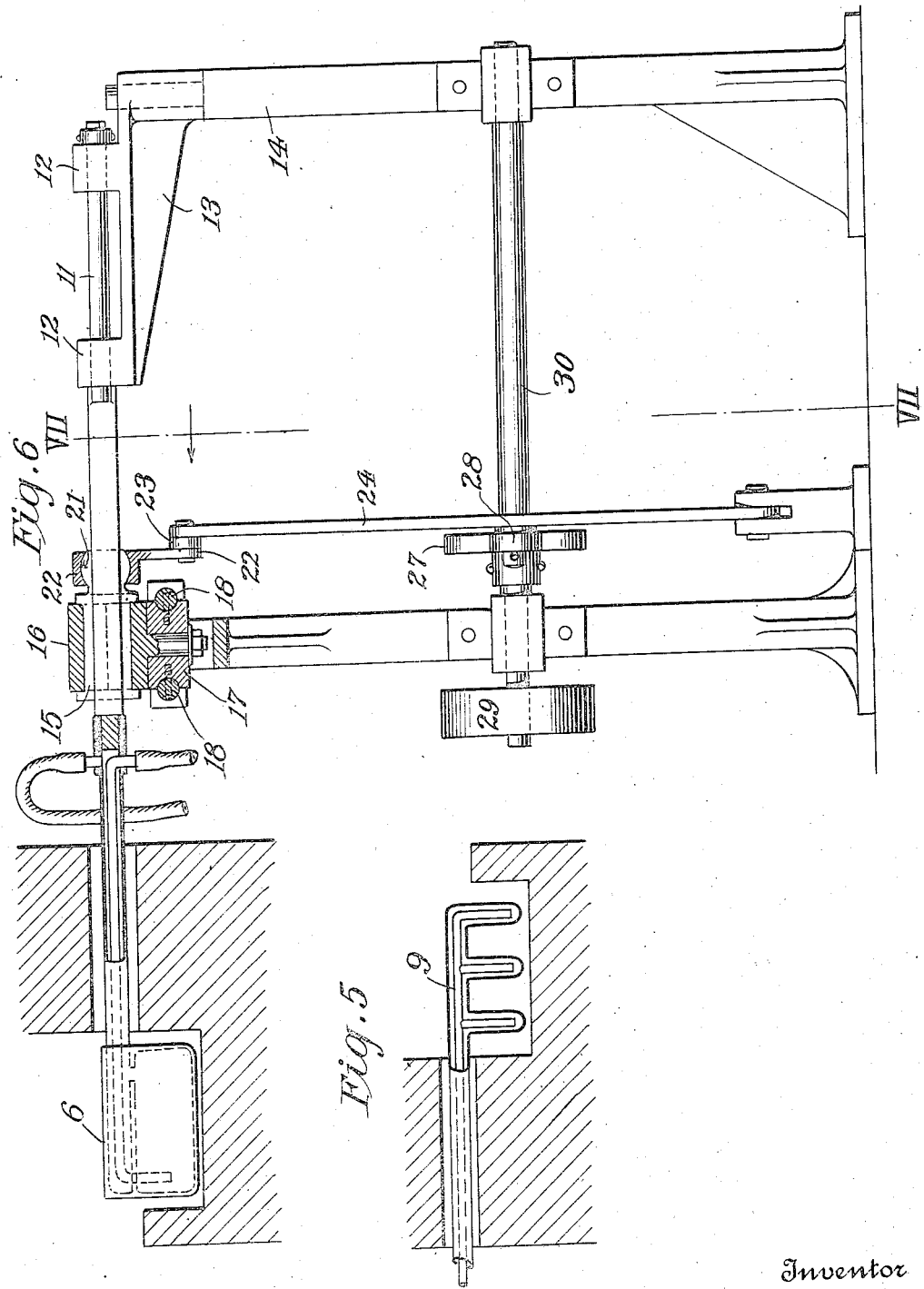

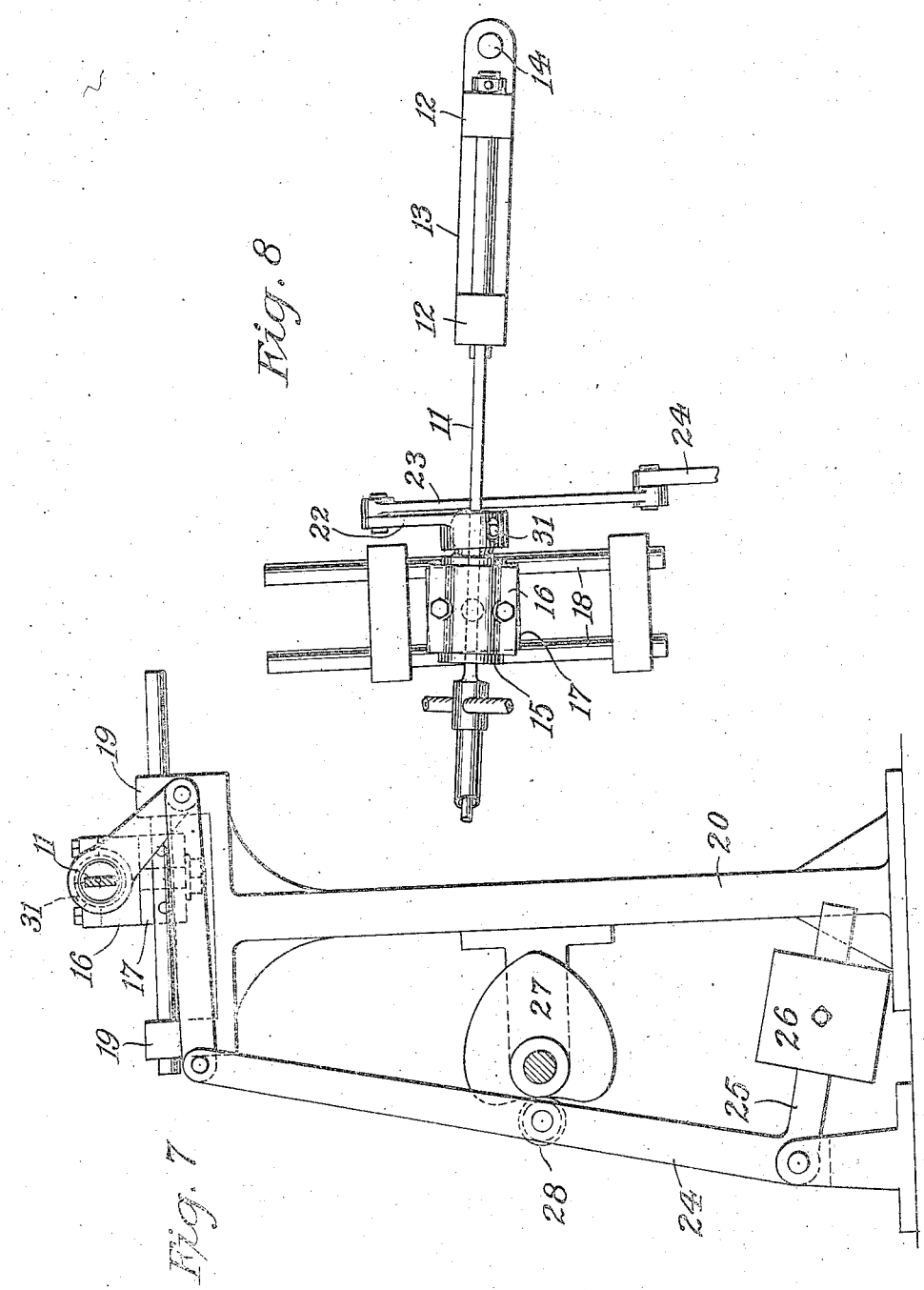

Patented Oct. 2, 1923.

1,469,457

UNITED STATES PATENT OFFICE.

ROBERT GOOD, OF WASHINGTON, PENNSYLVANIA.

MANUFACTURE OF GLASSWARE.

Application filed May 2, 1921. Serial No. 466,117.

*To all whom it may concern:*

Be it known that I, ROBERT GOOD, a citizen of the United States, residing at Washington, Washington County, Pennsylvania, have invented new and useful Improvements in the Manufacture of Glassware, of which the following is a specification, reference being had to the accompanying drawings, in which—

Figure 1:
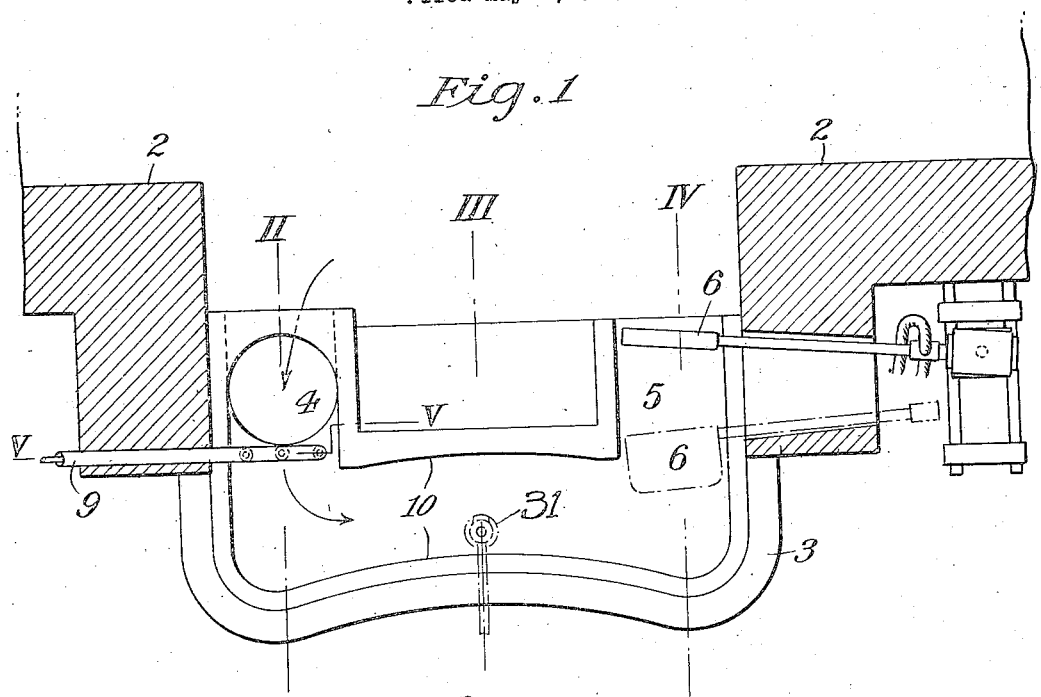
Figure 2:
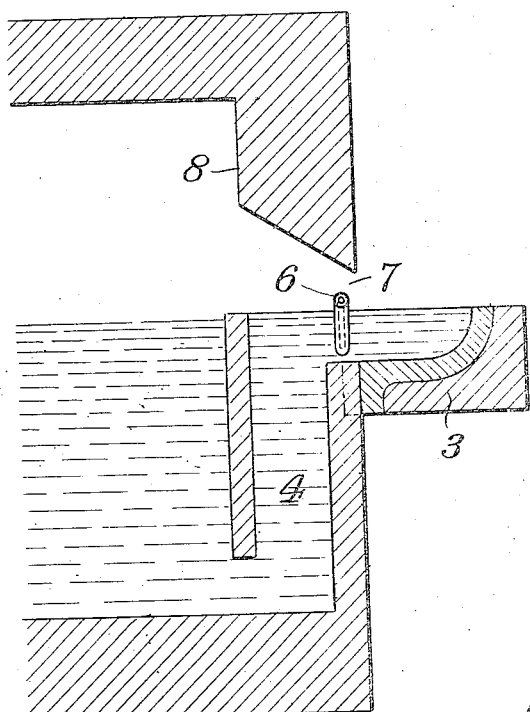
Figure 3:
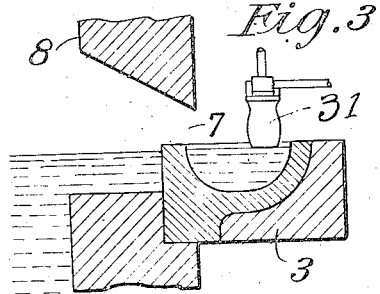

Fig. 1 is a partial section of a glass furnace or tank showing the application of my invention thereto; Figs. 2, 3, 4 and 5 are, respectively, sections on lines II—II, III—III, IV—IV and V—V of Fig. 1; Fig. 6 shows in side elevation partly in section the paddle mechanism; Fig. 7 is a section on lines VII—VII of Fig. 6; and Fig. 8 is a plan thereof.

My invention relates to the delivery of glass from a furnace or tank, and comprises providing a tank with a channel or trough leading from the molten glass in the furnace to a position in which the glass may be gathered and thence back into the furnace, so that very hot and homogeneous glass may be caused to flow from the furnace to the gathering position and the glass chilled by the gathering operation is carried back into the furnace, leaving a new and hot supply of glass for the next gathering implement to operate upon. My invention also consists in the shape of the trough, the furnace breast arrangement, the means for causing the flow of the glass, as well as in the construction and arrangement of parts which I shall hereinafter describe and claim.

Figure 4:
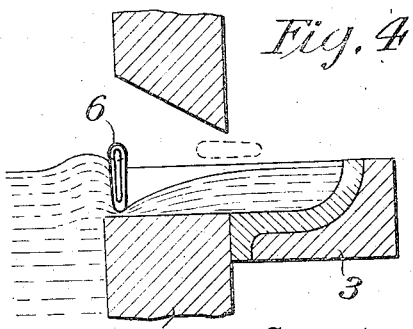

Referring to the drawings, 2 indicates the walls of a furnace or tank, which may be a glass melting furnace of any approved type. Projecting forwardly from the front wall is a channel or trough 3 to which glass is supplied from the body of glass in the tank through a hollow block 4, the bottom of which opens into the tank at a distance below the surface of the glass so that only the very hot and thoroughly molten glass will be able to flow out into the trough 3. In the discharge end 5 of the trough, where it re-enters the furnace, a paddle 6 preferably reciprocating is arranged, which pushes or causes the glass to flow from the trough 3 back into the furnace, as is best shown in Figs. 1 and 4. The displacement of the glass effected by the paddle 6 in the discharge end 5 of the trough induces a flow of hot glass upward through the block 4 and through the trough 3. The glass in the trough is kept from chilling unduly by the hot gases which escape through the slot 7 between the lower edge of the breast 8 of the furnace and the upper surface of the inner side of the trough.

To control the temperature of glass flowing through the trough 3 I have shown a water cooled device 9 for obstructing the channel or trough 3, which is shaped like a comb. The teeth of the comb 9 may be lowered into the surface of the glass to diminish the temperature of glass flowing through the trough 3.

As my improved furnace is designed primarily for the delivery of glass to forming devices rotating on the circumference of a circle such as machines of the Owens type, I have shown the walls 10 of the trough 3 curved to the radius of such a forming machine, so that the plungers or gathering devices 31, by which a gather may be obtained from the trough, will travel approximately through the center of the trough. This ensures the obtaining of a hot and homogeneous supply of glass, as the curvature of the trough will prevent the gathering devices from gathering glass near the sides of the trough, where it may have become chilled.

The paddle mechanism consists in a water cooled paddle 6 mounted on a shaft 11, the rear end of which is mounted in bearings 12 in a bracket 13 to permit rotation about its own axis, and the bracket 13 is pivoted on a vertical axis to a standard 14 to permit reciprocatory motion of the paddle. The paddle shaft 11 has upon it a sleeve 15 by which it is supported in a block 16. The block 16 is swiveled to a carrier 17 fixed on the rods 18, which reciprocate in bearings 19 on the frame 20. The sleeve 15 has upon one of its ends a bearing 21 for a lever arm 22 connected by a link 23 to the bell crank 24. The bell crank 24 is pivoted to the frame and has upon its extension 25 a weight 26 which forces the long arm of the bell crank 24 and the paddle shaft 11 through the link 23 and lever arm 22 in one direction, while the heart-shaped cam 27, which engages a roller 28 on the long arm of the bell crank 24, causes movement of the bell crank and through it the paddle shaft 11 in the opposite direction. The cam is actuated through the pulley 29, which is mounted on the cam shaft 30 from any suitable source of power.

When the cam 27 is set in rotation it engages the roller 28, as is best shown in Fig. 7, and forces the long arm of the bell crank 24 to the left against the action of the weight 26. This causes the paddle shaft to rotate to the left and clear the paddle from the glass, and also causes the shaft and with it the paddle in horizontal position to move to the left on the back stroke.

When the paddle has been moved to the dotted line position shown in Figs. 1 and 4 the rotation of the cam 27 permits the weight 26, through the crank 24 and link 23, to cause the lever arm 22 to rotate the paddle shaft 11 and with it the paddle into vertical position, and at the same time forces the shaft and paddle to the right, and the paddle pushes the glass in front of it back into the furnace.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In apparatus for making articles of glass, a furnace or tank, a channel for the molten glass communicating at both of its ends with the main body of the glass in the furnace, means for causing glass to flow through said channel and back into the furnace whereby a hot and homogeneous supply of glass is maintained in said channel for a gathering mechanism, the walls of the channel intermediate its ends being curved on the arc of a circle described by the movement of the gathering mechanism.

2. In apparatus for making articles of glass or the like, a furnace or tank, a channel for the molten glass communicating at both ends with the main body of glass in the furnace, means for causing the glass to flow through said channel, the entrance from the furnace into the channel comprising a hollow block, having an entrance opening from the furnace below the level of the glass and an exit opening into the channel.

3. In apparatus for making articles of glass or the like, a furnace or tank, a channel for the molten glass having its intermediate portion arranged without the wall of the furnace, said channel at its entrance end communicating with the molten glass in the furnace through a passage opening into the furnace at a distance below the surface of the molten glass in the furnace and at its exit end communicating with the surface glass in the furnace, and means for causing the glass to flow from the furnace into the entrance of the channel and out through the exit of the channel back into said furnace.

4. In apparatus for making articles of glass, a furnace or tank, a channel for the molten glass communicating at both of its ends with the main body of glass in the furnace, a paddle arranged in said channel to reciprocate and thereby cause the glass to flow from the furnace into one end and through the channel and out of the other end of the channel back into the furnace.

5. In apparatus for making articles of glass, a furnace or tank, a channel for the molten glass communicating at both of its ends with the main body of molten glass in the furnace, a reciprocating paddle in said channel, the paddle being arranged to engage and push the glass in the channel with its flat side during its forward stroke and to turn on its axis during its back stroke to feather over the top of the glass.

6. In apparatus for making articles of glass, a furnace or tank, a channel for the molten glass communicating at both its ends with the main body of the glass in the furnace, means for causing the molten glass to flow through the channel, the breast of the furnace immediately above the inner edge of said trough being slotted to permit the escape of heat from within the furnace chamber to maintain the glass in the trough in a highly heated condition.

ROBERT GOOD.